(12) United States Patent
Clark et al.

(10) Patent No.: US 12,305,901 B2
(45) Date of Patent: May 20, 2025

(54) SYSTEMS AND METHODS FOR ACTIVE COMPRESSOR CONTROL

(71) Applicant: Carrier Corporation, Palm Beach Gardens, FL (US)

(72) Inventors: Matthew Clark, Rochester, NY (US); Larry D. Burns, Avon, IN (US); Jun Pyo Lee, Zionsville, IN (US); Keyu Li, Shanghai (CN); Runfu Shi, Shanghai (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/813,146

(22) Filed: Jul. 18, 2022

(65) Prior Publication Data

US 2023/0064418 A1 Mar. 2, 2023

Related U.S. Application Data

(60) Provisional application No. 63/260,555, filed on Aug. 25, 2021.

(51) Int. Cl.
*F25B 49/02* (2006.01)
*F25B 40/06* (2006.01)
*F25B 41/34* (2021.01)

(52) U.S. Cl.
CPC .............. *F25B 49/02* (2013.01); *F25B 40/06* (2013.01); *F25B 41/34* (2021.01);
(Continued)

(58) Field of Classification Search
CPC .......... F25B 49/02; F25B 41/34; F25B 40/06; F25B 2600/2513; F25B 2700/1931; F25B 2700/1933; F25B 2700/21
See application file for complete search history.

(56) References Cited

U.S. PATENT DOCUMENTS

| | | | |
|---|---|---|---|
| 5,187,944 A * | 2/1993 | Jarosch | F25B 41/347 62/212 |
| 6,301,911 B1 | 10/2001 | Reason et al. | |

(Continued)

FOREIGN PATENT DOCUMENTS

| | | |
|---|---|---|
| CN | 106605362 B | 10/2018 |
| CN | 106605062 B | 8/2019 |

(Continued)

OTHER PUBLICATIONS

Inoue et al., Air Conditioner, Oct. 9, 2002, JP2002295915A, Whole Document (Year: 2002).*

(Continued)

*Primary Examiner* — Larry L Furdge
(74) *Attorney, Agent, or Firm* — Souad Hakim (57) ABSTRACT

A refrigeration system configured for controlling operation of a compressor is disclosed. The refrigeration system comprises an electronic expansion device operatively coupled with the compressor. The refrigeration system comprises a controller operatively coupled with the electronic expansion device. The controller is configured to control the electronic expansion valve based on a superheat setpoint range. The controller is further configured to adjust the superheat setpoint range in response to an operating point of the compressor being within a threshold distance from a boundary of an operational envelope for the compressor.

13 Claims, 4 Drawing Sheets

(52) U.S. Cl.
CPC .............. *F25B 2600/2513* (2013.01); *F25B 2700/1931* (2013.01); *F25B 2700/1933* (2013.01); *F25B 2700/21* (2013.01)

(56) References Cited

U.S. PATENT DOCUMENTS

| | | | |
|---|---|---|---|
| 6,321,543 B1 * | 11/2001 | Said | F25B 49/022 62/81 |
| 9,939,185 B2 | 4/2018 | Sunderland et al. | |
| 2015/0233623 A1 * | 8/2015 | Izadi-Zamanabadi | F25B 1/00 62/115 |
| 2020/0158391 A1 * | 5/2020 | Inamdar | F25B 41/35 |

FOREIGN PATENT DOCUMENTS

| | | | |
|---|---|---|---|
| CN | 106796070 B | | 8/2020 |
| JP | 2001141323 A | * | 5/2001 |
| JP | 2002295915 | * | 10/2002 |
| JP | 2007255781 A | * | 10/2007 |

OTHER PUBLICATIONS

Ishigami et al., Freezer, Oct. 4, 2007, JP2007255781A, Whole Document (Year: 2007).*
Tanabe et al., Air Conditioner, May 25, 2001, JP2001141323A, Whole Document (Year: 2001).*

* cited by examiner

SYSTEMS AND METHODS FOR ACTIVE COMPRESSOR CONTROL

CROSS REFERENCE TO A RELATED APPLICATION

The application claims the benefit of U.S. Provisional Application No. 63/260,555 filed Aug. 25, 2021, the contents of which are hereby incorporated in their entirety.

BACKGROUND

The invention relates generally to compressor controls and, more specifically, to active compressor control.

Compressors may generally be an important component in refrigeration systems (e.g., heat pumps, air conditioning, refrigeration systems, etc.). Consequently, protecting the compressor and preventing failure during operation are important factors to an effective operation of the refrigeration systems.

BRIEF DESCRIPTION

Aspects of the disclosure relate to methods, apparatuses, and/or systems for active compressor control.

In some embodiments, a refrigeration system configured for controlling operation of a compressor is disclosed. The refrigeration system comprises an electronic expansion device operatively coupled with the compressor. The refrigeration system comprises a controller operatively coupled with the electronic expansion device. The controller is configured to control the electronic expansion valve based on a superheat setpoint range. The controller is further configured to adjust the superheat setpoint range in response to an operating point of the compressor being within a threshold distance from a boundary of an operational envelope for the compressor.

In some embodiments, adjusting the superheat setpoint range includes adjusting an upper superheat setpoint of the superheat setpoint range.

In some embodiments, adjusting the superheat setpoint range includes adjusting a lower superheat setpoint of the superheat setpoint range.

In some embodiments, the controller is configured to control the electronic expansion device based on a superheat setpoint threshold within the setpoint range; and adjust the superheat setpoint threshold within the setpoint range in response to the operating point of the compressor being within the threshold distance from a boundary of the operational envelope for the compressor.

In some embodiments, the operational envelope for the compressor define one or more compressor operating points corresponding to suction and discharge pressures of a fluid in the refrigeration system.

In some embodiments, the refrigeration system comprises one or more sensors, operatively coupled with the refrigeration system, the electronic expansion valve, and the controller, the one or more sensors configured to generate output signals indicating one or more operating parameters of the refrigeration system, the operating parameters including temperature or pressure in the refrigeration system. In some embodiments, the controller is configured to control the electronic expansion device based on the one or more operating parameters of the refrigeration system.

In some embodiments, the compressor is a fixed speed compressor.

In some embodiments, a method for actively controlling operation of a compressor of a refrigeration system with an electronic expansion device, is provided. The method comprises controlling the electronic expansion device based on a superheat setpoint range; and adjusting the superheat setpoint range in response to an operating point of the compressor being within a threshold distance from a boundary of an operational envelope for the compressor.

In some embodiments, the method further comprises adjusting an upper superheat setpoint of the superheat setpoint range.

In some embodiments, the method further comprises adjusting a lower superheat setpoint of the superheat setpoint range.

In some embodiments, the method further comprises controlling the electronic expansion device based on a superheat setpoint threshold within the setpoint range; and adjusting the superheat setpoint threshold within the setpoint range in response to the operating point of the compressor being within the threshold distance from a boundary of the operational envelope for the compressor.

In some embodiments, the method further comprises generating, with one or more sensors, output signals indicating one or more operating parameters of the refrigeration system, the operating parameters including temperature or pressure in the refrigeration system; and controlling the electronic expansion valve based on the one or more operating parameters of the refrigeration system.

In some embodiments, a controller is provided. The controller comprises at least one processor; and memory storing instructions executable by the at least one processor, the instructions when executed cause the system to control an electronic expansion valve based on a superheat setpoint range; and adjust the superheat setpoint range in response to an operating point of a compressor being within a threshold distance from a boundary of an operational envelope for the compressor.

Various other aspects, features, and advantages of the invention will be apparent through the detailed description of the invention and the drawings attached hereto. It is also to be understood that both the foregoing general description and the following detailed description are examples and not restrictive of the scope of the invention.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

The present disclosure, in accordance with some embodiments, describes a refrigeration system 100 configured to actively control a compressor (of the refrigeration system 100) using an electronic expansion device (EXV). In some embodiments, refrigeration system 100 may use the electronic expansion device to control an operating envelope of a fixed speed compressor. In some embodiments, refrigeration system 100 may include a controller for controlling the EXV based on a position of the operating point of the compressor in the operating envelope (or map). For example, in some embodiments, in response to the compressor operating point being within the envelope and far enough from the envelope boundaries, the controller may be configured to control the EXV based on a superheat setpoint (e.g., suction or discharge superheat setpoints). In some embodiments, in response to the distance between the operating point and the envelope boundaries being within a threshold distance, the controller may be configured to adjust the superheat setpoint to prevent the compressor from operating out of the envelope boundaries. In some embodiments, in response to the operating point being outside the envelope boundaries, the controller may be configured to control the EXV (e.g., control the degree of opening up or down) to drive the system back within the envelope. Accordingly, the present control methods and systems may help protect the compressor, help prevent failure during operation, and provide effective refrigeration systems operations. These methods may also help extend the compressor life (since there may be less chances of operating out of the envelope because of the active control) and reduce the need for other protection devices which may be cost beneficial. The user experience may also be improved because there may be less shutdown-startup cycles.

Figure 1:
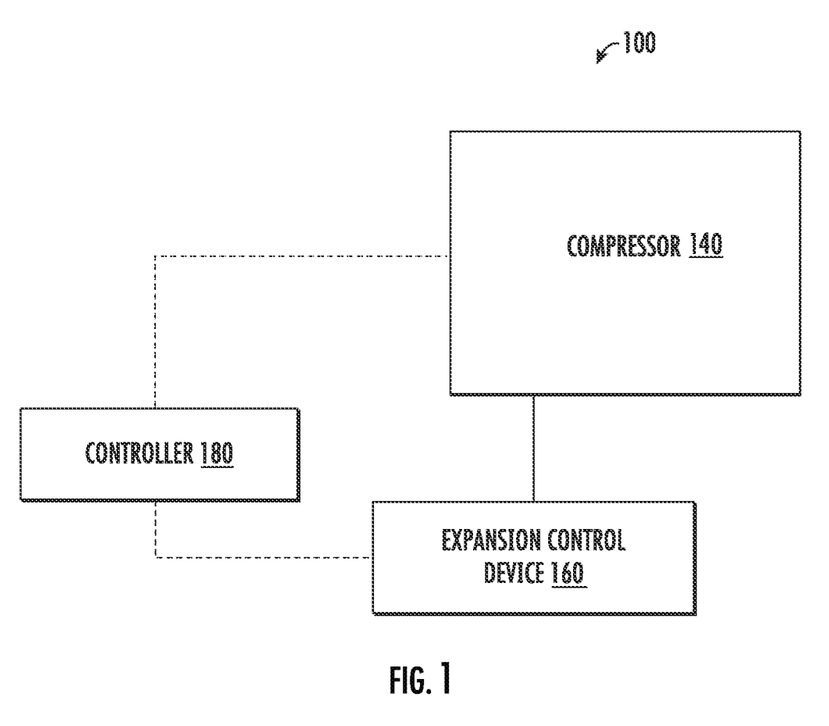
FIG. 1 shows an example of a refrigeration system configured for controlling operation of a compressor, in accordance with one or more embodiments.

FIG. 1 shows a refrigeration system 100 configured for actively controlling a compressor, in accordance with one or more embodiments. In some embodiments, refrigeration system 100 may include a compressor 140, an electronic expansion device 160, and a controller 180 (and/or one or more additional/other components which are known to one of ordinary skill in the art). For example, refrigeration system 100 may further include other components that perform or assist in the performance of one or more processes that are consistent with disclosed embodiments.

In some embodiments, refrigeration system 100 may include a compressor 140 configured to receive and compress a fluid (such as refrigerant) to higher temperature and pressure before providing it to other components of refrigeration system 100. In some embodiments, compressor 140 may be configured to operate within a compressor operating envelope. The operating envelope may indicate a range of operating parameters to be handled by the compressor at various stages of operation. In some embodiments, operating within the operating envelope may provide a higher performance reliability and efficiency, and may limit stress on the compressor. The failure to operate within the compressor operating envelope may result in unnecessary wear and tear or failure.

In some embodiments, the operating envelope may define one or more operating regions for compressor 140. For example, in some embodiments, the operating regions may include a region inside and a region outside the operating envelope. In some embodiments, the operating envelope may define a plurality of regions. In some embodiments, refrigeration system 100 may be configured to control operation of the electronic expansion device 160 to keep the compressor operating within the one or more operating regions (as discussed herein). In some embodiments, compressor 140 may be a scroll compressor, a reciprocating compressor, or a rotary vane compressor, for example, and/or any other type of compressor. The compressor 12 may be any type of variable-capacity compressor that is operable in a low-capacity mode or a high-capacity mode. For example, the compressor 140 may be or include a multi-stage compressor, a group of independently operable compressors, a compressor having modulated suction (e.g., blocked suction), a compressor having fluid-injection (e.g., an economizer circuit), a pulse-width-modulated scroll compressor configured for scroll separation (e.g., a digital scroll compressor), a compressor having variable-volume-ratio valves configured to leak intermediate-pressure working fluid, or a compressor having two or more of the above capacity modulation means. In some embodiments, compressor 140 may be a fixed speed compressor. In some embodiments, compressor 140 may be a variable speed compressor. It will be appreciated that the compressor 140 could include any other additional or alternative operating structure.

In some embodiments, electronic expansion device 160 may be operatively coupled with the compressor 140. In some embodiments, electronic expansion device 160 may be configured to control flow of a fluid (e.g., refrigerant or gas) into compressor 140. In some embodiments, the electronic expansion device 160 may be configured to regulate the superheat of the fluid flowing in the compressor 140. In some embodiments, a position of electronic expansion device 160 (or degree of opening) may be adjusted based on a superheat setpoint or based on one or more operating parameters of the refrigeration system 100.

In some embodiments, controller 180 may be operatively coupled with the electronic expansion device and the compressor 140. In some embodiments, controller 180 may be configured to control the electronic expansion device 160 based on a fluid superheat setpoint. In some embodiments, the fluid superheat setpoint may be a suction or discharge superheat setpoint. In some embodiments, controller 180 may be configured to control the electronic expansion device 160 based on a fluid superheat setpoint range for the refrigeration system. In some embodiments, the fluid superheat setpoint range may be a suction or discharge superheat setpoint range. The fluid superheat setpoint range for the refrigeration system may include a minimum superheat setpoint and a maximum superheat setpoint. In some embodiments, controller 180 may be configured to determine the superheat setpoint based on operation parameters of compressor 140 (e.g., suction or discharge temperatures, suction or discharge pressures, or other operating parameters of compressor 140 or refrigeration system 100). In some embodiments, controller 180 may be configured to adjust the superheat setpoint within the superheat setpoint range based on the operations parameters of compressor 140. In some embodiments, controller 180 may be configured to adjust the superheat setpoint range (e.g., adjust the maximum or minimum superheat setpoints) based on the operations of compressor 140.

In some embodiments, controller 180 may be configured to adjust the superheat setpoint based on the position of the operating point of compressor 140 in the operational envelope of the compressor (e.g., the operating point being inside or outside the envelope). For example, in some embodiments, the superheat setpoint (e.g., suction or discharge setpoint) may be adjusted up or down within the superheat setpoint range to keep the compressor operating within the envelope. In some embodiments, controller 180 may be configured to adjust the superheat setpoint responsive to the position of the operating point being within a threshold distance from one of the envelope boundaries. In some embodiments, the superheat range may be adjusted based on the position of the operating point of the compressor in the operational envelope. For example, the maximum or minimum superheat setpoints may be adjusted based on the position of the compressor in the envelope to try to keep the compressor within the envelope. For example, the maximum or the minimum superheat setpoint may be adjusted (up or down) responsive to the operating position of the compressor being within a threshold distance from one of the envelope boundaries.

In some embodiments, controller 180 may be configured to adjust the superheat setpoint based on the region of the operational envelope where the compressor operating point is located. For example, the superheat set point may be adjusted responsive to the operating point being in a particular region (of the plurality of regions) in the operational envelope. In some embodiments, the superheat setpoint may be adjusted (e.g., up or down) within the superheat setpoint range responsive to the operating point of the compressor within the particular region. For example, controller 180 may be configured to adjust the superheat setpoint responsive to the position of the operating point being within a threshold distance from one of the particular region boundaries. Similarly, in some embodiments, the superheat range the maximum or minimum superheat setpoints) may be adjusted based the region or the position within the particular region of the operational envelope. In some embodiments, for example, the maximum or the minimum superheat setpoint may be adjusted (up or down) responsive to the operating position of the compressor being within a threshold distance from one of the particular region boundaries.

Figure 2:
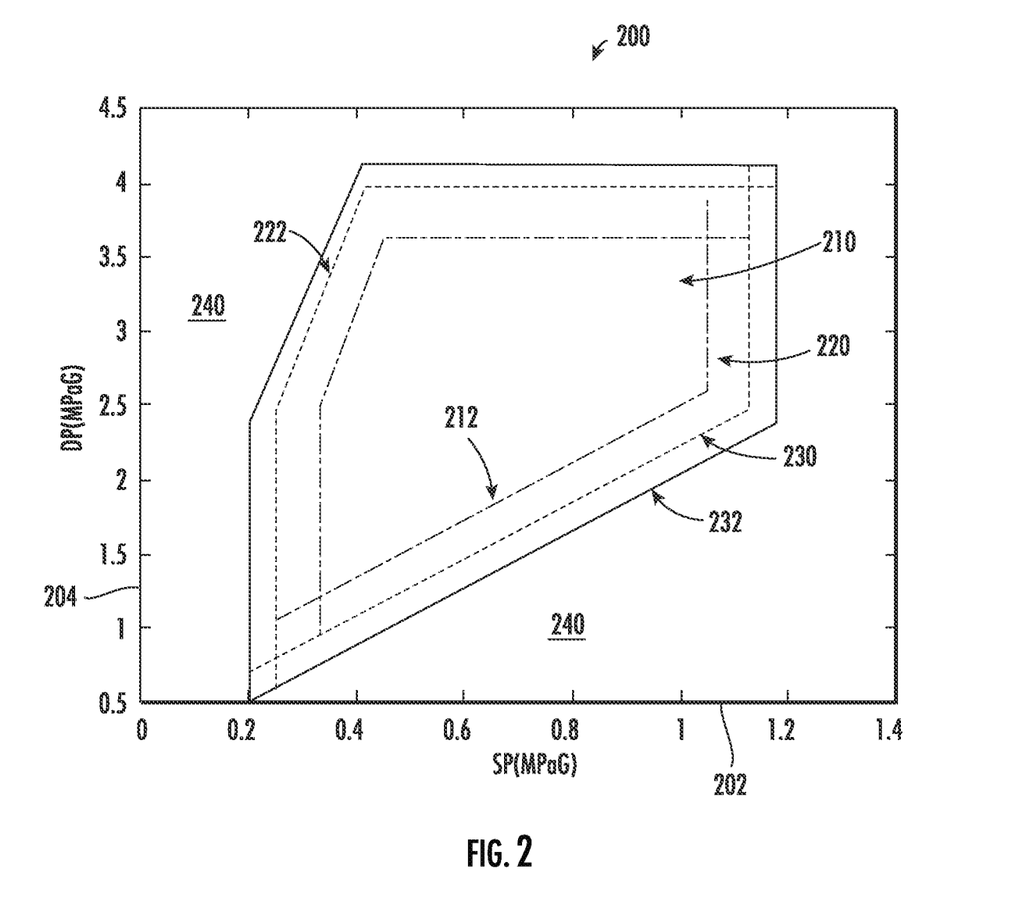
FIG. 2 shows an example of a compressor operational envelope, in accordance with one or more embodiments of the present disclosure.

In some embodiments, controller 180 may include one or more processors configured to execute instructions stored on a memory to perform one or more operations of refrigeration system 100 described herein. Other components known to one of ordinary skill in the art may be included in refrigeration system 100 to gather, process, transmit, receive, acquire, and provide information used in conjunction with the disclosed embodiments. In addition, refrigeration system 100 may further include other components that perform or assist in the performance of one or more processes that are consistent with disclosed embodiments, FIG. 2 shows an example of an operational envelope 200, in accordance with one or more embodiments of the present disclosure. In some embodiments, the operational envelope 200 may be used to control operations of compressor 140 (shown in FIG. 1). Operational envelope 200 includes an axis 202 representing the suction pressure of a refrigerant entering the compressor 140 and an axis 204 representing the discharge pressure of the refrigerant exiting the compressor 140. As such, an operational point of the compressor is determined by matching a value of the suction pressure on the axis 202 with a value of the discharge pressure on the axis 204. The location of the operational point may indicate a performance of the compressor 140. For example, a first region 210, of operating envelope 200 may represent operating conditions of the compressor 140 as determined by the suction and discharge pressures. In some embodiments, operating within region 210 may enable the refrigeration system 100 (shown in FIG. 1) to perform efficiently. The first operating region 210 may vary based on the compressor, the application of the compressor 140, the application of the refrigeration system 100, the electronic expansion device, the other components of the refrigeration system 100, and/or the compressor specifications.

In some embodiments, boundary 212 defining first region 210 is indicative of the target pressure ranges of the refrigerant. In some embodiments, when the compressor is operating within first region 210, the electronic expansion device may be controlled based on a first superheat threshold value or a first superheat range (e.g., the position of the expansion device is adjusted to maintain the superheat at or around the superheat threshold or within the superheat threshold range). In some embodiments, to maintain operation of the compressor within first region 210, the electronic expansion device is controlled based on the first superheat threshold or the first superheat range (e.g., the first superheat range may include a first lower superheat threshold and a first upper superheat threshold). In some embodiments, the first superheat threshold value or the first superheat range may be adjusted to maintain operations of the compressor within the first operating region 210. In some embodiments, the first superheat threshold, the first lower superheat threshold, or the first upper superheat threshold may vary among different refrigeration systems, and may be based on the application of the compressor 140, the application of the refrigeration system 100, the electronic expansion device, the other components of the refrigeration system 100, and/or the compressor specifications.

In some embodiments, a second operating region 220 may be located outside of first region 210. Second region 220 may be defined by the boundary 212 and by a boundary 222. The boundary 222 may be located within a distance of from boundary 212. The distance between boundaries 212 and 222 at any given point may be defined by a suction and discharge pressure difference based on operations of the compressor or the refrigeration system. The distance between the boundaries is shown to be fixed along boundaries 212 and 222 for illustration purposes only; in some embodiments, the distance between these boundaries may be different at different point along the boundaries. In some embodiments, the boundary 222 of second region 220 may represent an operating condition threshold as defined by compressor operation points and corresponding suction and discharge pressures. The compressor operation points that correspond to boundary 222 of the second region 220 may vary based on the compressor and its application, the refrigeration system and its application, the electronic expansion device, the other components of the refrigeration system 100, and/or the system specifications.

In some embodiments, when the compressor is operating within second region 220, the electronic expansion device may be controlled based on a second superheat threshold value or a second superheat range (e.g., the position of the expansion device is adjusted to maintain the superheat at or around the second superheat threshold or within the second superheat threshold range). In some embodiments, to maintain operation of the compressor within second region 220, the electronic expansion device may be controlled based on the second superheat threshold or the second superheat range (the second superheat range may include a second lower superheat threshold and a second upper superheat threshold). In some embodiments, the second superheat threshold value or the second superheat range may be adjusted to maintain operations of the compressor within the second operating region 220. In some embodiments, the second superheat threshold, the second lower superheat threshold, or the second upper superheat threshold may vary based on the compressor 140 and it's application, refrigeration system 100 and its application, the electronic expansion device, the other components of the refrigeration system 100, and/or the system specifications.

That said, in some embodiments, the electronic expansion device may be still controlled based on the first superheat threshold or the first superheat range determined for first region 210 even if the compressor is operating within second region 220. For example, the superheat may be maintained at the first threshold values or the first range even when the compressor is outside of the first region and now operating within second region 220. In some embodiments, the electronic expansion device may be controlled based on the second superheat threshold or the second superheat range based on the performance of the compressor reaching a first threshold performance. The first threshold performance of the compressor (or the refrigeration system) may be determined based the compressor 140 and its application, refrigeration system 100 and its application, the electronic expansion device, the other components of the refrigeration system 100, and/or the system specifications.

In some embodiments, a third operating region 230 may be located outside of second region 220. Third region 230 is defined by the boundary 222 and by a boundary 232. The boundary 232 may be located within a distance of from boundary 222. The distance between boundaries 222 and 232 at any given point may be defined by a suction and discharge pressure difference based on operations of the compressor or the refrigeration system. The distance between the boundaries is shown to be fixed along boundaries 222 and 232 for illustration purposes only. In some embodiments, the distance between these boundaries may be different at different point of the boundaries. In some embodiments, the boundary 232 of second region 230 may represent an operating condition threshold as defined by compressor operation points based on corresponding suction and discharge pressures. The compressor operation points that correspond to boundary 232 of the second region 230 may vary based on the compressor and its application, the refrigeration system and its application, the electronic expansion device, the other components of the refrigeration system 100, and/or the system specifications.

In some embodiments, when the compressor is operating within third region 230, the electronic expansion device may be controlled based on a third superheat threshold value or a third superheat range (e.g., the position of the expansion device is adjusted to maintain the superheat at or around the third superheat threshold or within the third superheat threshold range). In some embodiments, to maintain operation of the compressor within third region 230, the electronic expansion device is controlled based on the third superheat threshold or the third superheat range (the third superheat range may include a third lower superheat threshold and a third upper superheat threshold). In some embodiments, the third superheat threshold value or the third superheat range may be adjusted to maintain operations of the compressor within the third operating region 230. In some embodiments, the third superheat threshold, the third lower superheat threshold (of the third superheat range), or the third upper superheat threshold (of the third superheat range) may vary based on the compressor 140 and its application, refrigeration system 100 and its application, the electronic expansion device, the other components of the refrigeration system 100, and/or the system specifications.

That said, in some embodiments, the electronic expansion device may be still controlled based on the second superheat threshold or the second superheat range determined for second region 220 even if the compressor is moving to operation within third region 230. For example, the superheat may be maintained at the second superheat threshold or the second superheat range values even when the compressor is outside of the second region and now operating within third region 230. In some embodiments, the electronic expansion device may be controlled based on the third superheat threshold or the third superheat range based on the performance of the compressor reaching a second threshold performance. The second threshold performance of the compressor (or the refrigeration system) may be determined based the compressor 140 and its application, refrigeration system 100 and its application, the electronic expansion device, the other components of the refrigeration system 100, and/or the system specifications.

FIG. 2 shows a fourth region 240 located beyond boundary 232. The fourth region is the outer operating region of the operating envelope 200. In some embodiments, responsive to operating in fourth region 240, the compressor may be configured to shut down. In some embodiments, the controller may be configured to close the electronic expansion devise responsive to the compressor reaching (e.g., at or around) boundary 232. In some embodiments, the controller may be configured to close the electronic expansion device when the compressor operates in fourth region 240 regardless of the value of the superheat in the system. operating in fourth region 240. The compressor may be controlled to shut down when operating in fourth region 240 to prevent damage and prolong life of the compressor. As explained above, the operational envelope (or the control plan of the compressor), the control of the electronic expansion device, and the adjustment of the superheat thresholds and ranges may be determined based on the compressor and its application, the refrigeration system and its application, the electronic expansion device, the other components of the refrigeration system, and/or the system specifications.

It's to be understood that the operating envelope described herein is for illustrative purposes only, other operation controls or envelopes may be considered and are consistent with the present disclosure (e.g., suction and discharge temperatures envelopes, or envelopes that define other compressor operating parameters). Additionally, other the operating regions may be used and are consistent with the present disclosure. For example, In some embodiments, fewer than four operating regions may be used with one or two inner regions and one outer region, and where the electronic expansion device and the superheat values are adjusted to help keep the compressor operating within the inner regions (and shutting down when in the outer region). Similarly, in some embodiments, the number of operating regions may be greater than four regions where the electronic expansion device and the superheat values are adjusted to help keep the compressor operating within the inner regions (and shutting down when in the outer region).

Figure 3:
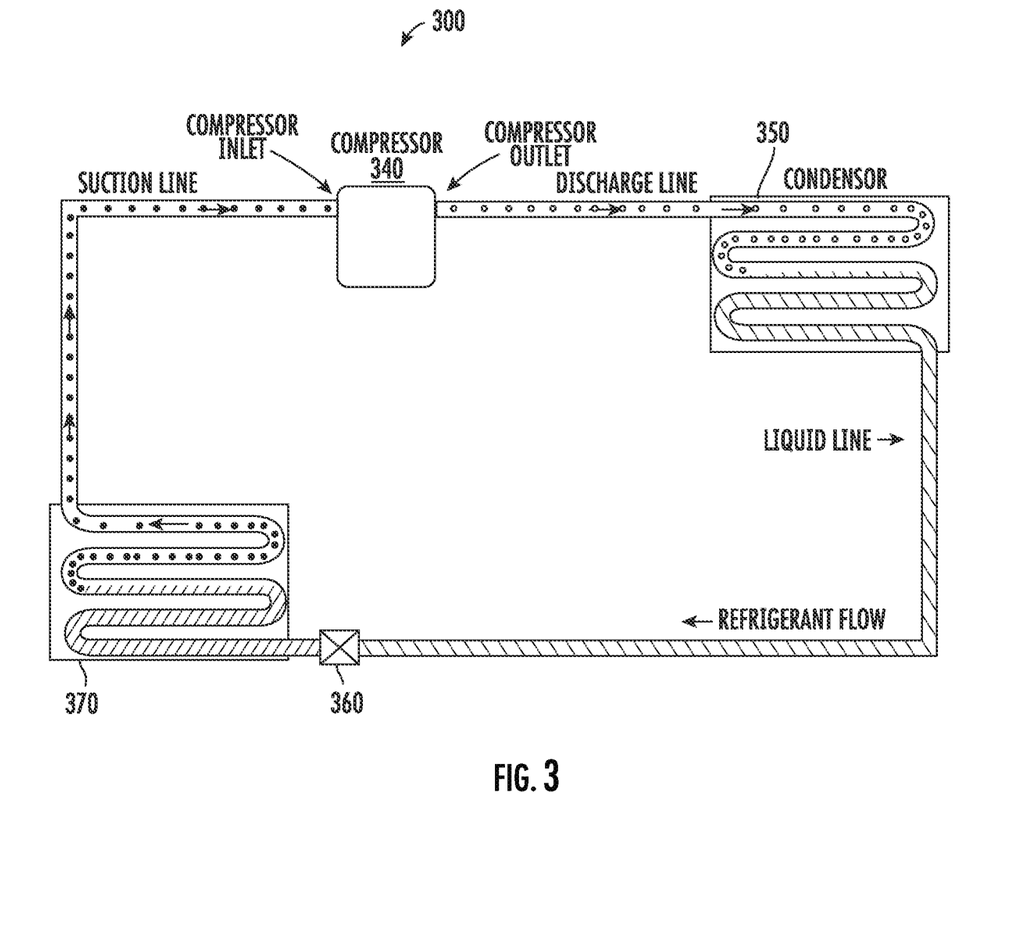
FIG. 3 shows an example of a refrigeration system, according to one or more embodiments.

FIG. 3 shows a schematic representation of an example of a refrigeration system 300, in accordance with one or more embodiments of the present disclosure. Refrigeration system 300 includes an electronic expansion device 360 configured to control operations of compressor 340 according to one or more embodiments of the present disclosure. In some embodiments, refrigeration system 300 may include a condenser 350 and an evaporator 370. Other components known to one of ordinary skill in the art may be included in refrigeration system 300. For example, refrigeration system 300 may further include other components that perform or assist in the performance of one or more processes that are consistent with disclosed embodiments.

In some embodiments, in a refrigeration cycle, refrigerant enters a suction inlet of compressor 340 with a low-pressure gas state (suction pressure). The refrigerant is compressed to a high-pressure high temperature gas state (discharge pressure). The high-pressure and high-temperature gas exits a discharge outlet of compressor 340 then enters condenser 350. Condenser 350 cools the high-pressure and high-temperature gas allowing it to condense to a high-pressure liquid by transferring heat to a lower temperature medium (e.g., ambient air). Electronic expansion device 360 may be configured to restrict flow of the refrigerant entering evaporator 370. In some embodiments, electronic expansion device may be controlled by a controller (not shown here) as explained above. In some embodiments, the electronic expansion device 360 may be controlled based on the superheat of the refrigerant when it leaves evaporator 370. In some embodiments, (as described above) the expansion device 360 may be controlled based on the operating point of the compressor (the suction and discharge pressure values, suction and discharge temperatures, or other operating parameters for the compressor).

In some embodiments, refrigeration system 300 may include one or more sensors (not shown) configured to generate output signals indicating one or more operating parameters in refrigeration system 300 (e.g., operating parameters for compressor 340 or parameters for other components of system 320). In some embodiments, the parameters may include one or more of compressor suction or discharge temperature or pressure; temperature, pressure, or humidity of fluid leaving or entering the evaporator; temperature, pressure, or humidity of fluid leaving or entering the condenser; or other operating parameters of refrigeration system 300. In some embodiments, one or more operating parameters may be measured directly by the sensors. For example, the suction or discharge pressure or temperature may be measured directly by temperature or pressure sensors located at the inlet or outlet of the compressor. In some embodiments, one or more operating parameters may be determined based on sensor measurements for other operating parameters (e.g., for other components). For example, in some embodiments, the compressor discharge temperature or pressure may be determined (or estimated) based on temperature or humidity measurements of fluid entering or leaving condenser 350. In some embodiments, the compressor suction temperature or pressure may be determined (or estimated) based on temperature or humidity measurements of fluid entering or leaving evaporator 370. In some embodiments, the one or more sensors may be located anywhere within refrigeration system 300. For example, at the inlet or outlet of any components of refrigeration system 300, anywhere on the low side of the system, or the high side of the system.

Figure 4:
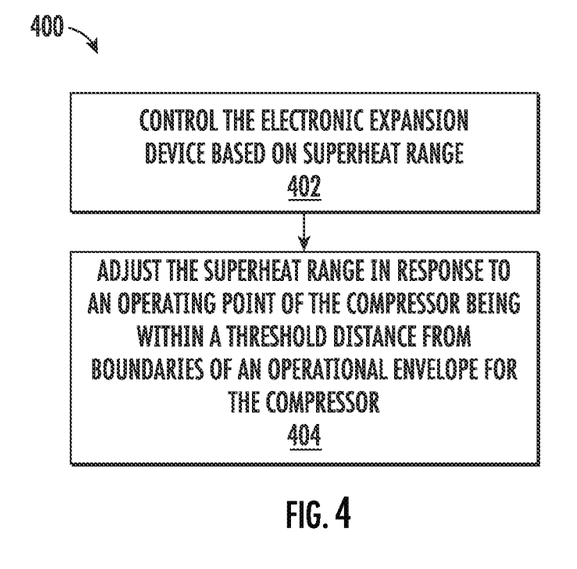
FIG. 4 shows a flow diagram of an exemplary method for controlling operation of a compressor, in accordance with one or more embodiments.

FIG. 4 is a flow diagram illustrating an exemplary method 400 for controlling operation of a refrigeration system, in accordance with one or more embodiments of the present disclosure.

At an operation 402 of method 400, an electronic expansion device is controlled based on a superheat range for a compressor. In some embodiments, operation 402 may be performed by a controller the same as or similar to controller 180 (shown in FIG. 1 and described herein).

At an operation 404 of method 400, the superheat range is adjusted in response to an operating point of the compressor being within a threshold distance from boundaries of an operational envelope for the compressor. In some embodiments, operation 404 may be performed by a controller the same as or similar to controller 180 (shown in FIG. 1 and described herein).

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every.

What is claimed is:

1. A refrigeration system configured for controlling operation of a compressor, the refrigeration system comprising:
an electronic expansion device operatively coupled with the compressor; and
a controller operatively coupled with the electronic expansion device and the compressor, wherein the controller comprises one or more processors configured to execute instructions stored on a memory, the instructions when executed, cause the controller to:
control a degree of opening of the electronic expansion device based on a superheat setpoint range, wherein the superheat setpoint range is determined by the controller and is based on operating parameters of the refrigeration system, wherein the operating parameters comprise a value of a suction pressure of a refrigerant entering the compressor and a value of a discharge pressure of the refrigerant exiting the compressor;
determine, via one or more sensors, that an operating point of the compressor is within a threshold distance from a boundary of a plurality of boundaries of an operational envelope for the compressor; and
adjust the superheat setpoint range based on a position of the operating point of the compressor in the operational envelope, in response to the determination that the operating point of the compressor is within the threshold distance, wherein the compressor is a fixed speed compressor.

2. The refrigeration system of claim 1, wherein adjusting the superheat setpoint range includes adjusting an upper superheat setpoint of the superheat setpoint range.

3. The refrigeration system of claim 1, wherein adjusting the superheat setpoint range includes adjusting a lower superheat setpoint of the superheat setpoint range.

4. The refrigeration system of claim 1, wherein the controller is configured to:
control the electronic expansion device based on a superheat setpoint threshold within the superheat setpoint range; and
adjust the superheat setpoint threshold within the superheat setpoint range in response to the operating point of the compressor being within the threshold distance from the boundary of the operational envelope for the compressor.

5. The refrigeration system of claim 1, wherein the operating parameters of the refrigeration system further comprise one or more of:
suction temperature of the refrigerant entering the compressor;
discharge temperature of the refrigerant exiting the compressor;
temperature, pressure, humidity of the refrigerant entering an evaporator of the refrigeration system;
temperature, pressure, humidity of the refrigerant exiting the evaporator of the refrigeration system;
temperature, pressure, humidity of the refrigerant entering a condenser of the refrigeration system; and
temperature, pressure, humidity of the refrigerant exiting the condenser of the refrigeration system.

6. The refrigeration system of claim 1, wherein the one or more sensors are operatively coupled with the controller and configured to generate output signals indicating the operating parameters of the refrigeration system.

7. A method for actively controlling operation of a compressor of a refrigeration system with an electronic expansion device, the method comprising:
controlling the electronic expansion device based on a superheat setpoint range, wherein the superheat setpoint range is based on operating parameters of the refrigeration system, wherein the operating parameters comprise a value of a suction pressure of a refrigerant entering the compressor and a value of a discharge pressure of the refrigerant exiting the compressor;
determining that an operating point of the compressor is within a threshold distance from a boundary of a plurality of boundaries of an operational envelope for the compressor; and
adjusting the superheat setpoint range based on a position of the operating point of the compressor in the operational envelope, in response to the determination that the operating point of the compressor is within the threshold distance, wherein the compressor is a fixed speed compressor.

8. The method of claim 7, wherein adjusting the superheat setpoint range includes adjusting an upper superheat setpoint of the superheat setpoint range.

9. The method of claim 7, wherein adjusting the superheat setpoint range includes adjusting a lower superheat setpoint of the superheat setpoint range.

10. The method of claim 7, further comprising:
controlling the electronic expansion device based on a superheat setpoint threshold within the superheat setpoint range; and
adjusting the superheat setpoint threshold within the superheat setpoint range in response to the operating point of the compressor being within the threshold distance from the boundary of the operational envelope for the compressor.

11. The method of claim 7, wherein the operating parameters of the refrigeration system further comprise one or more of:
suction temperature of the refrigerant entering the compressor;
discharge temperature of the refrigerant exiting the compressor;
temperature, pressure, humidity of the refrigerant entering an evaporator of the refrigeration system;
temperature, pressure, humidity of the refrigerant exiting the evaporator of the refrigeration system;
temperature, pressure, humidity of the refrigerant entering a condenser of the refrigeration system; and
temperature, pressure, humidity of the refrigerant exiting the condenser of the refrigeration system.

12. The method of claim 7, further comprising:
generating, with one or more sensors, output signals indicating the operating parameters of the refrigeration system.

13. A controller, comprising:
at least one processor; and
memory storing instructions executable by the at least one processor, the instructions when executed cause the controller to:
control an electronic expansion device based on a superheat setpoint range, wherein the superheat setpoint range is determined by the controller and is based on operating parameters of a refrigeration system, wherein the operating parameters comprise a value of a suction pressure of a refrigerant entering a compressor and a value of a discharge pressure of the refrigerant exiting the compressor, wherein the compressor is a fixed speed compressor;
determine, via one or more sensors, that an operating point of the fixed speed compressor is within a threshold distance from a boundary of a plurality of boundaries of an operational envelope for the fixed speed compressor; and
adjust the superheat setpoint range based on a position of the operating point of the fixed speed compressor in the operational envelope, in response to the determination that the operating point of the fixed speed compressor is within the threshold distance.

* * * * *